(12) United States Patent
Pac Gracia

(10) Patent No.: US 9,233,801 B2
(45) Date of Patent: Jan. 12, 2016

(54) ACCUMULATING CONVEYOR

(71) Applicant: Tunkers Iberica S.L., Badalona (ES)

(72) Inventor: Jose Pac Gracia, Castelldefels Barcelona (ES)

(73) Assignee: TUNKERS IBERICA S.L., Badalona (Barcelona) (ES)

( * ) Notice: Subject to any disclaimer, the term of this patent is extended or adjusted under 35 U.S.C. 154(b) by 189 days.

(21) Appl. No.: 13/993,388

(22) PCT Filed: Nov. 16, 2012

(86) PCT No.: PCT/EP2012/004759
§ 371 (c)(1),
(2) Date: Jun. 12, 2013

(87) PCT Pub. No.: WO2013/079167
PCT Pub. Date: Jun. 6, 2013

(65) Prior Publication Data
US 2013/0334009 A1    Dec. 19, 2013

(30) Foreign Application Priority Data
Dec. 1, 2011   (DE) ..................... 20 2011 108 528 U

(51) Int. Cl.
*B65G 47/28*    (2006.01)
*B65G 47/26*    (2006.01)
*B65G 19/02*    (2006.01)
*B65D 35/06*    (2006.01)
*B65G 17/00*    (2006.01)

(52) U.S. Cl.
CPC .............. *B65G 47/261* (2013.01); *B65D 35/06* (2013.01); *B65G 17/002* (2013.01); *B65G 19/02* (2013.01)

(58) Field of Classification Search
USPC ......................................... 198/459.8; 60/718
See application file for complete search history.

(56) References Cited

U.S. PATENT DOCUMENTS 6,321,900 B1 * 11/2001 Micklethwaite .............. 198/498
7,134,356 B2 * 11/2006 Schonnenbeck et al. .... 74/411.5

FOREIGN PATENT DOCUMENTS

GB    2 316 665 A    3/1998
KR    10-0964493    6/2010

OTHER PUBLICATIONS

English translation of International Preliminary Report of Appln. No. PCT/EP2012/004759 dated Jun. 12, 2014 in English.

\* cited by examiner

*Primary Examiner* — Gene Crawford
*Assistant Examiner* — Lester Rushin
(74) *Attorney, Agent, or Firm* — Fitch, Even, Tabin and Flannery LLP

(57) ABSTRACT

The invention relates to an accumulating conveyor for use in body manufacturing of the motor vehicle industry, for example for conveying body parts on pallets. The movement of the pallets is restricted in the region of the relevant reversing station and said pallets are conveyed from the top strand to the bottom strand and from the bottom strand to the top strand in a form-fitting manner by means of driver wheels via driver pins, wherein the driver pins are automatically coupled and decoupled again to the driver wheels.

20 Claims, 3 Drawing Sheets

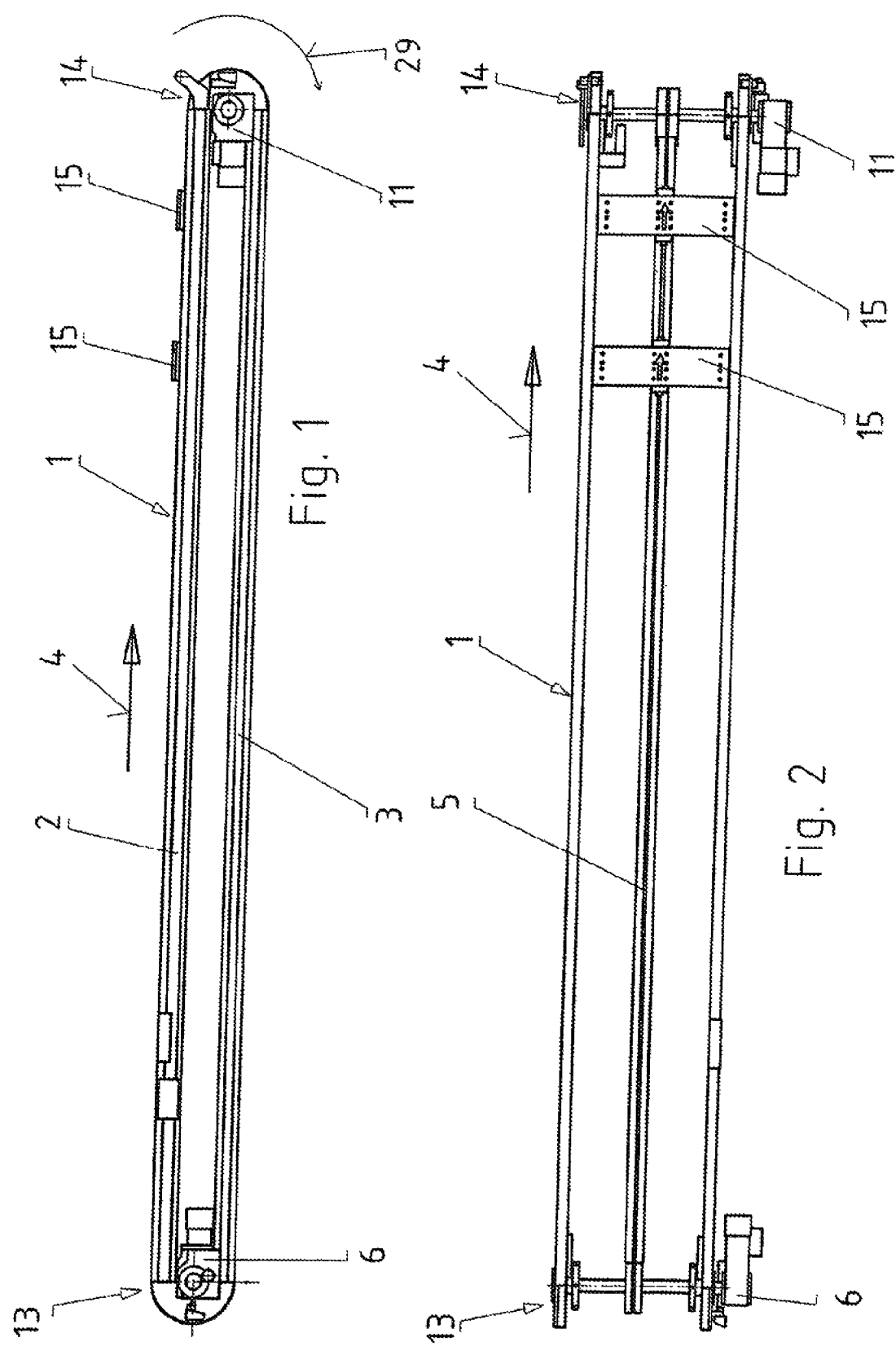

ized angular position, in particular, in the region of the loading or unloading station.

ACCUMULATING CONVEYOR

TYPE

The invention relates to an accumulating conveyor, in particular for use in the motor vehicle industry, for example for conveying body parts.

PRIOR ART

Accumulating conveyors are known. They generally consist of a motor-driven bottom strand and top strand which are used to convey pallets which serve to receive workpieces, for example sheet-like parts from body manufacturing and from or else to which components can be removed or supplied, for example manually, or else also by a robot arm. The strands of accumulating conveyors of this type move in two planes which are arranged one above the other and are generally horizontal, and run endlessly via reversing stations arranged at a distance from one another.

The drive of the pallets in the region of what are referred to as deflecting stations may be problematic, namely when components are intended to be removed or arranged on the pallets in certain regions by hand or by a robot arm. Particularly in the case of fully mechanized operation, the pallets have to be stopped at a precisely predetermined position and driven so that a collision with the robot arm does not occur or people are injured.

PROBLEM

The invention is based on the problem of inventively configuring an accumulating conveyor of the required type in such a manner that the pallets can be stopped at an exactly predetermined angular position at the predetermined reversing station, but also can be set into motion again, so that precise loading and unloading is possible even by a robot.

SOLUTION

In one aspect of the present invention, the problem is solved by providing an accumulating conveyor, in particular for use in the motor vehicle industry, for example for conveying body parts on pallets, comprising a motor driven, flexible tension element, for example belt or chain which is guided in the region of the reversing stations via respective gearwheels, and each gearwheel is respectively arranged on a shaft, wherein the one gearwheel is connected in terms of drive to the associated shaft for conjoint rotation, and said shaft is driven, for example continuously, by an electric motor which is controllable or regulatable in the rotational speed thereof, in particular an asynchronous motor, and the other gearwheel is mounted on the other shaft via a freewheel on said shaft, and said associated shaft in the freewheel can be switched on as required by a controllable or regulatable electric motor, for example likewise an asynchronous motor, for activating at least one predetermined angle of rotation for the purpose of driving the shaft and can be stopped at least one angle of rotation position, with driver wheels arranged on the shaft for conveying pallets.

In another aspect of the present invention, the problem is solved by providing an accumulating conveyor, in particular for use in the motor vehicle industry, for example for conveying body parts on pallets, comprising a flexible tension element which is motor-driven, for example continuously, for example a belt or a chain, which is guided in the region of the reversing stations via gearwheels respectively arranged on shafts, wherein the end regions of each shaft are each assigned a driver wheel which is drivable in a slip-free manner by the relevant shaft, wherein the driver wheels have radially running openings which are arranged at an angular distance from one another over the circumference of said driver wheels and in each of which a driver pin which is spring-loaded towards the periphery is arranged, said driver pins automatically engaging in a form-fitting manner in the relevant reversing station in driver openings arranged on opposite sides on the pallets and also being automatically released again on the opposite strand, wherein, on the loading or unloading side, the one gearwheel is arranged in a freely rotatable manner on the associated shaft via a freewheel, and said shaft is driven by an electric motor which can be switched on and off and is controllable or regulatable in the rotational speed thereof, in such a manner that, on entry into the associated reversing station, the relevant pallet passes a sensor which detects the position of the pallet and transmits a switching pulse, whereupon the electric motor sets the shaft into rotation and, on further rotation, passes a further sensor which then decelerates the rotation speed of the electric motor and, on a further rotational movement which corresponds to the loading or removal station of the pallet, switches off the energy supply to the electric motor and brings the electric motor into a stopping position, whereupon the relevant angular position of the driver wheels of the shaft is mechanically locked and, after the loading or unloading of the relevant pallet and after the mechanical unlocking, the energy supply to the electric motor is switched on again and the shaft is set into rotation and, after reaching the starting position, by the energy supply to the electric motor being switched off, the driver wheels are rotated again into the starting position thereof by stopping of the shaft.

A NUMBER OF ADVANTAGES

The novel solutions noted above it possible to use accumulating conveyors in which the flexible tension element, in particular a belt or a chain, is driven, for example continuously, by an electric motor, for example a preferably regulable or controllable asynchronous motor, which drives pallets for receiving workpieces, for example sheet-like parts in the body manufacturing of the motor vehicle industry. Said pallets are loaded and/or unloaded in the region of a reversing station. The loading and/or unloading are/is undertaken manually or by a robot, making it necessary for the pallets to have to be exactly stopped at a predetermined position at the loading or unloading station because, otherwise, a collision with the robot arm could occur or people there could even be injured.

In the case of the invention, the movement of the pallets is braked in the region of the relevant reversing station and said pallets are conveyed from the top strand to the bottom strand and from the bottom strand to the top strand in a form-fitting manner by driver wheels via driver pins, wherein the driver pins are automatically coupled and decoupled again to and from the driver wheels. For this purpose, use is made of suitable openings on the relevant pallets, into which the driver pins latch in a spring-loaded manner.

The driver wheels on the loading or unloading side are driven at a precise angle by an electric motor arranged here, in particular a controllable or regulable asynchronous motor. The control is undertaken by an optionally programmable SPC which receives the relevant signals via sensors which detect the relevant angular position of the associated driver wheels, and therefore the electric motor can be switched on and also stopped again at precisely predetermined angular positions. It is thereby possible to activate a loading or unloading station at a precise angle and to stop the pallets very precisely at said angular position. If need be, said angular position can also be additionally ensured by a mechanical lock, but this is not required in all cases. The flexible tension element is driven continuously and is guided via gearwheels which are arranged on shafts. One of said shafts is driven in a reversing station. The relevant gearwheel is coupled fixedly in terms of drive to said shaft, for example by a tongue and groove joint, while the gearwheel is arranged on the other shaft by means of a freewheel such that the shaft is normally at a standstill. If required, said shaft is driven by a different electric motor which is arranged here and can likewise be designed as a controllable or regulable asynchronous motor, in order further to transport the pallets arriving here and also to stop said pallets at the predetermined angular position. After the loaded or unloaded pallet has been transferred to the bottom strand, further transportation is undertaken by the flexible tension element, since the driver pins are automatically decoupled from the driver wheels on the bottom strand, while they are further transported on the opposite side and the reversing station provided here by driver pins provided there and the driver wheels arranged here to the top strand.

It is thereby possible to determine the particular stopping position of the pallets at the loading or unloading station in a very sensitive manner.

FURTHER INVENTION REFINEMENTS

Further inventive refinements are described below.

In one refinement of the accumulating conveyor, the rotational movement of the drive shaft for the pallets are controlled via the pallet itself and sensors arranged thereon by the energy supply to the electric drive motor for the shaft of the driver wheels being controlled via said sensors. The movements, in particular the sequence of controls, can be incorporated in a stored program control (SPC), and therefore all of the movements of the pallets, the stopping thereof at a predetermined angular position at the relevant reversing station, the creep speed or the like are stored in a program.

A further inventive refinement for the accumulating conveyor is characterized in that the shaft having the freewheel on the loading or unloading side of the relevant reversing station has two spaced-apart driver wheels which convey the pallet in a form-fitting manner from the top strand to the bottom strand and at least one, preferably a plurality of sensors, is or are assigned, for example, to the driver wheels, said sensor(s) controlling the energy supply to the electric motor, which drives the shaft, depending on the angle of rotation position of the driver wheels.

In another refinement, centering pin receiving openings are arranged at a uniform angular distance from one another over the circumference of the driver wheel. This results in the pallets being reliably carried along in the relevant reversing station.

If another embodiment, a secure, form-fitting connection is produced between the spring-loaded centering pins and the coupling recesses on the underside of the relevant pallet. The centering pins latch and unlatch mechanically and automatically during the rotational movement of the driver wheels without manual intervention.

In another refinement, it is ensured that even directly before the beginning of the rotational movement and still in the upper horizontal region of the top strand, centering pins engage in the associated coupling recesses on the underside of the relevant pallet such that the latter are conveyed in a reliable and slip-free manner through the relevant reversing station. Braking devices are advantageously arranged on both sides of the accumulating conveyor in the region of the relevant reversing station, said braking devices decelerating and braking the circulating speed of each pallet on entry into the relevant reversing station.

Each pallet is forcibly guided on both sides by means of rollers in rail guides in another refinement.

In another embodiment, each pallet has braking rollers which interact on both sides with the relevant braking device, said braking rollers interacting with the braking device by striking thereagainst, wherein the braking device has a swingable lever which can be pivoted downwards by the pallet counter to the resetting force of a spring element.

The invention is illustrated—partially schematically—by means of an exemplary embodiment in the drawing, in which:

FIG. 1 shows a side view of an accumulating conveyor,

FIG. 2 shows a top view of FIG. 1,

Figure 3:
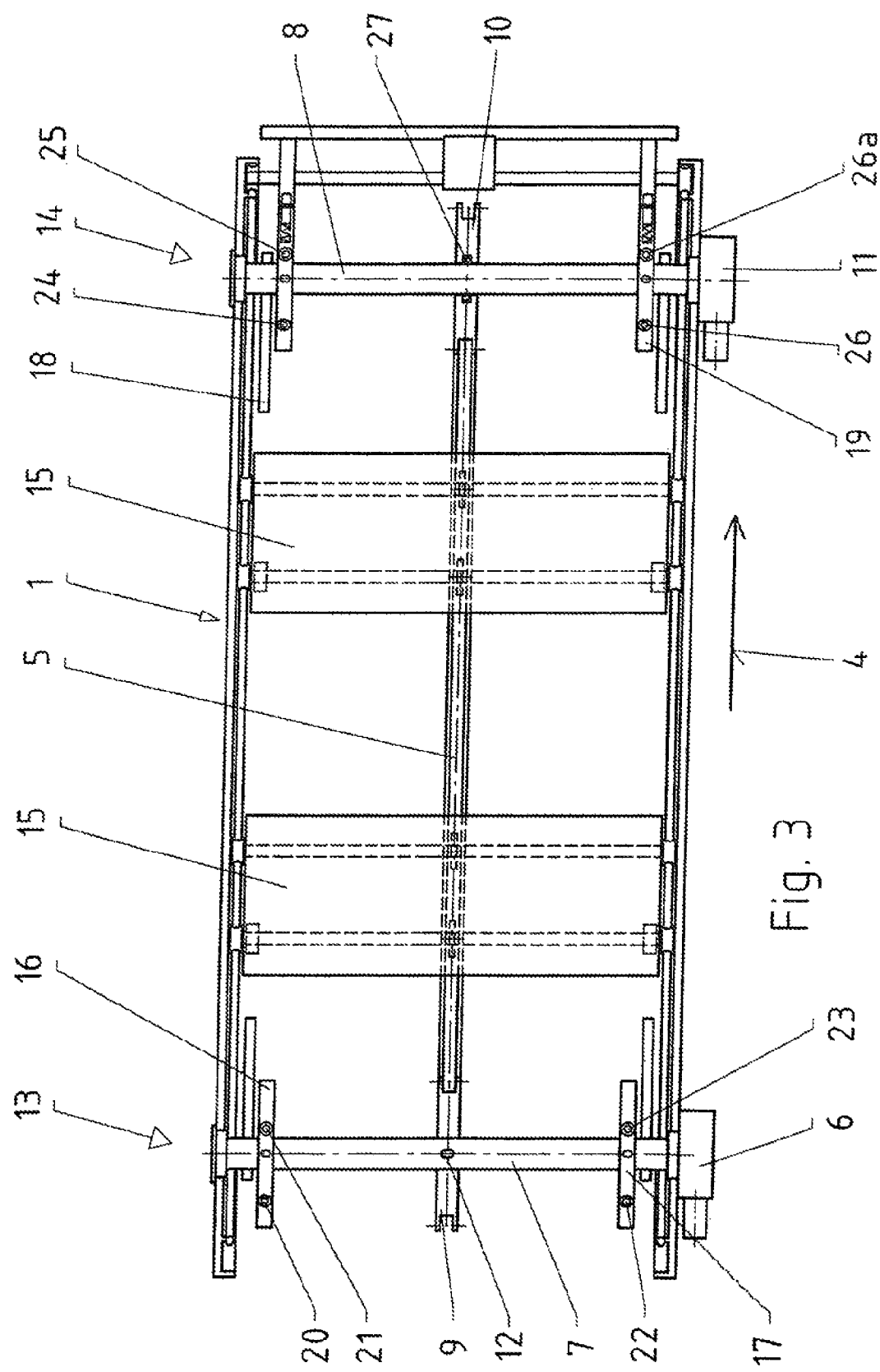
FIG. 3 shows a top view according to FIG. 2, on a larger scale, wherein the conveyor is illustrated in shortened form.

In the drawing, an accumulating conveyor which has a top strand 2 and a bottom strand 3 is denoted overall by the reference number 1. The conveying direction is identified by the arrow 4.

A flexible tension element which is denoted by the reference number 5, is merely indicated schematically in the drawing and which can be designed as a chain or belt is driven. Said flexible tension element 5 is driven by an electric motor 6 which is controllable or regulable in the rotational speed thereof and is preferably incorporated in a stored program control (SPC) and drives the flexible tension element 5 continuously, i.e. constantly, preferably in the direction of the arrow 4, i.e. in one direction, for the particular operating case.

The reference numbers 7 and 8 denote shafts which are mounted with little friction in bearings and on each of which a gearwheel 9, 10 is arranged approximately centrally. The gearwheel 10 is arranged in the freewheel on the shaft 8 via bearings, in particular rolling contact bearings. This shaft 8 is at a standstill, if required, but can be driven for the operating sequence described below by an electric motor 11, which is likewise controllable or regulable and is in the form of, for example, an asynchronous motor, and, at predetermined angular positions, can be stopped and, if required, also arrested in the rotational speed thereof. Since the electric motor 6 constantly drives the flexible tension element 5, the shaft 7 is connected to the gearwheel 9 in terms of drive, for example is connected in terms of drive to the gearwheel 9, which is in the form of a pinion, by means of an adjustment spring 12.

Reversing stations are denoted by the reference numbers 13 and 14. The flexible tension element 5 conveys pallets 15 in the direction 4 from the top strand 2 to the bottom strand 3 in the reversing station 14 and from the bottom strand 3 to the top strand 2 in the reversing station 13. Workpieces (not illustrated), for example sheets of body parts for motor vehicle manufacturing, are arranged on the pallets 15, which workpieces can be handled by a robot arm at the particular unloading station, for example in the region of the reversing station 14. However, it is also possible to operate the pallets 15 manually, i.e. to load the pallets with suitable workpieces and also to unload them again. The pallets with the workpieces fastened thereon can have a considerable weight, and therefore, in the particular station where, for example, the workpieces are removed by a robot arm or manually, the pallets have to be able to stop at a precisely predetermined position so that there is not a crash with the robot arm or even injuries to people involved here.

What is not illustrated is at least one stopping device which can bring the pallets 15 to a standstill, so that the following pallets can catch up, while the pallet 15 required in each case is then conveyed further, and, by means of braking devices assigned to both sides of the relevant reversing station, can be either brought to the creep speed or to a zero speed such that said pallets can be further transported in the manner to be described below. A plurality of stopping devices of this type can also be provided over the length of the accumulating conveyor 1. The functions of the drive motors 6 and 11, and also the function of the stopping devices and the function of a robot (not illustrated) can be incorporated into a stored program control (likewise not illustrated).

In the end region on both sides, driver wheels 16, 17 and 18, 19 are arranged in terms of drive on each shaft 7 and 8. Each driver wheel 16, 17 and 18, 19 has a plurality of openings at uniform angular distances from one another over the circumference of said driver wheels, with only the openings 20, 21 and 22, 23 and 24, 25 and 26, 26a being illustrated and denoted in FIG. 3 for the sake of simplicity. All of the driver wheels 16, 17 and 18, 19 can have the same number of openings 20-26a, but also, if required, can have a different number of driver openings.

In the embodiment illustrated, the openings 20-26a are each in the form of blind bores and can have the same dimensions for all of the driver wheels 16-19. The openings 20-26a run radially with respect to the associated shaft 7 or and, at the lowest point therein, each have compression spring elements (not illustrated), in particular helical compression springs, which subject driver pins, which are arranged in the openings 20-26a and are likewise not denoted specifically, captively to prestress radially outwards, wherein the driver pins protrude by preferably the same radial amount out of the periphery of the associated driver wheels 16, 17 and 18, 19.

Braking devices (not illustrated specifically) with braking arms, which are configured, for example, as angle levers which are swingable about an axis, are in each case assigned on both sides to one or both reversing stations 13 or 14, preferably at least to the reversing station 14. Each pallet 15 is in each case assigned at least one braking roller on each side, wherein the undersides of the pallets 15 also have guide rollers on opposite sides, by which said pallets are forcibly guided in rails. In the relevant reversing station 13 or 14, upon running onto a slope of the braking device, the braking rollers press downwards in the angle lever counter to the resetting force of a spring element and therefore decelerate the movement of the relevant pallet 15 to a creep speed or to a stop. In addition, at least one stopping device can additionally be arranged in the conveying direction 4 such that the pallets 15 can be braked to a standstill and stopped and piled up. At the relevant reversing station, for example the reversing station 14, said pallets are then braked by the braking devices arranged on both sides, for example to the creep speed or to a standstill.

Normally, the driver wheels 18, 19 are at a standstill at the loading or unloading station, for example the reversing station 14, since the shaft 8 is not driven by the flexible tension element 5 because said shaft can rotate freely in a freewheel 27, for example in a rolling contact bearing, i.e. the flexible tension element 5 moves continuously in the direction 4 without, in the process, driving the shaft 8 and the driver wheels 18, 19.

When a pallet 15 arrives, for example, at the reversing station 14 and when said pallet has been braked by the braking device, which is provided there and is arranged on both sides, to the creep speed or even to a standstill, said pallet is in a position in which the driver pins assigned to the driver wheels 18 and 19 can engage in coupling openings (not illustrated) arranged on the underside of the relevant pallet 15, wherein said driver pins latch radially outwards into the relevant coupling openings of the driver opening 18 and 19 by means of the spring elements assigned to the driver pins.

Figure 4:
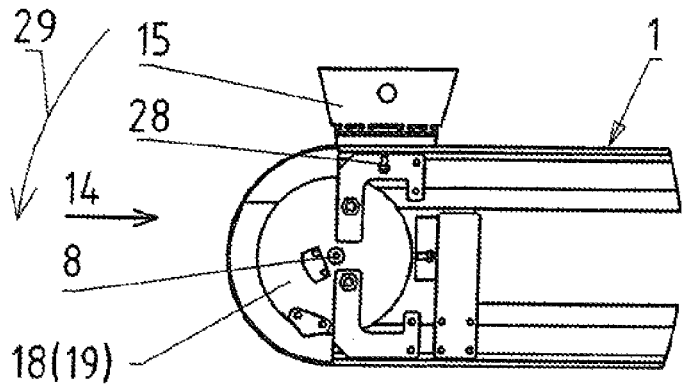
FIG. 4 to FIG. 7 show different positions of a pallet in the region of a reversing station with sensor positions and a locating position.

If an inductive sensor 28 detects the position of the pallet 15 in the reversing station 14 and indicates this to the associated control, the control switches on the current supply to the electric motor 11 which, as a result, begins to rotate the associated shaft 8, to be precise in the conveying direction of the flexible tension element 5. By rotation of the corresponding shaft 8, the associated drivers 18 and 19, which are connected to the shaft 8, for example by tongue and groove joints, are also set in a slip-free manner into rotation, as a result of which the driver pins engage in the corresponding coupling openings on the underside of the relevant pallet 15 and carry the latter along in a form-fitting manner and convey said pallet further from the upper strand 2 in the direction of the arrow 29 (FIG. 1). This initial movement is illustrated schematically in FIG. 4.

Figure 5:
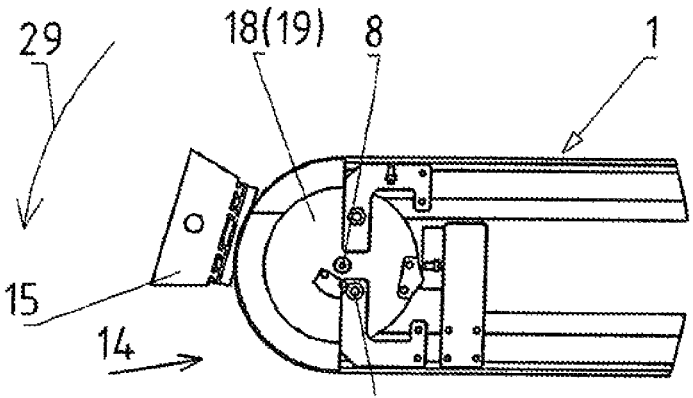

If the pallet 15 passes the position in FIG. 5, the sensor 28a detects a pre-stopping position and switches the energy supply to the drive motor 11 into the creep speed such that the shaft 8 rotates at a lower rotational speed, which has the consequence of a corresponding synchronous rotation of the drive wheels 18 and 19.

Figure 6:
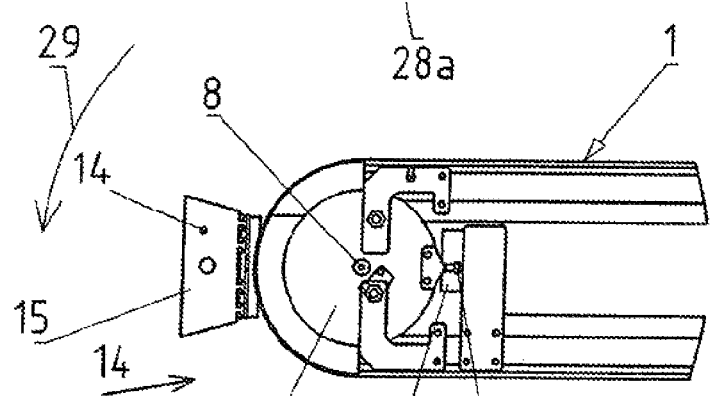
Figure 7:
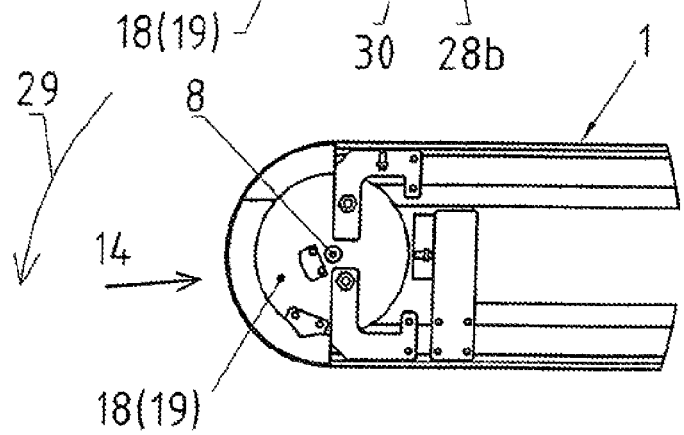

In what is referred to as the locating position according to FIG. 6, that is detected by the sensor 28b, the energy supply to the drive motor is interrupted such that the shaft 8 and therefore the driver wheels 18 and 19 remain stationary. In this position, the relevant pallet 15 can be loaded or unloaded, for example by a robot arm. In order absolutely reliably to ensure said position, mechanical locking by a mechanical component 30 (FIG. 6), for example a pin which latches or is inserted automatically into a locking opening in one or both driver wheels 18, 19 can also be undertaken in this position. This operation can be undertaken, for example, by a cylinder which is incorporated into the sequence control, for example into an SPC, and is correspondingly programmed. If required, the mechanical locating position can also be omitted and the arresting of the pallet 15 in this position in the relevant reversing station 14 can also be ensured by stopping the drive motor 11. The rotational direction of the pallet 15 in the reversing station 14 is shown at 29.

The mechanical locking can be controlled by cams which provide corresponding switching pulses. Furthermore, various sensors which are assigned to the different switching positions according to FIGS. 4 to 7 are possible. All possible sensors, but preferably inductive sensors, which damp corresponding counter-components are suitable.

The features which are described in the patent claims and in the description and are apparent from the drawing may be essential both individually and in any combinations for realizing the invention.

REFERENCE NUMBERS

1 Accumulating conveyor
2 Top strand
3 Bottom strand
4 Conveying direction
5 Tension element, flexible, chain, belt
6 Electric motor, asynchronous motor
7 Shaft
8 "

9 Gearwheel
10 "
11 Electric motor, asynchronous motor
12 Adjustment spring
13 Reversing station
14 "
15 Pallet
16 Driver wheel
17 "
18 "
19 Driver wheel
20 Opening
21 "
22 "
23 "
24 "
25 "
26 "
26a "
27 Freewheel
28 Sensor
28a Sensor
28b Sensor
29 Conveying direction
30 Component, mechanical, locking station

The invention claimed is:

1. Accumulating conveyor for conveying parts on pallets, comprising a motor driven, flexible tension element, which is guided in the region of reversing stations via first and second gearwheels, the first gearwheel being arranged on a first shaft and the second gearwheel being arranged on a second shaft, wherein the first gearwheel is connected in terms of drive to the first shaft for conjoint rotation, and said first shaft is driven, by an electric motor which is controllable or regulatable in the rotational speed thereof, and the second gearwheel is mounted on the second shaft via a freewheel on said second shaft, and said second shaft in the freewheel can be switched on as required by a controllable or regulatable electric motor for activating at least one predetermined angle of rotation for the purpose of driving the second shaft and can be stopped at least one angle of rotation position, with driver wheels arranged on at least the second shaft for conveying pallets.

2. Accumulating conveyor according to claim 1, characterized in that the rotational movement of the second shaft having the freewheel on the loading or unloading side of the pallets is controlled via sensors.

3. Accumulating conveyor according to claim 1, characterized in that the second shaft having the freewheel on the loading or unloading side of the relevant reversing station has two spaced apart driver wheels which convey the pallet in a form fitting manner from a top strand of the flexible tension element to a bottom strand of the flexible tension element, and at least one sensor is assigned, said at least one sensor controlling the energy supply to the electric motor, which drives the second shaft, depending on the angle of rotation position of the driver wheels.

4. Accumulating conveyor for conveying parts on pallets, comprising a flexible tension element which is motor-driven and which is guided in the region of reversing stations via gearwheels respectively arranged on shafts, wherein the end regions of each shaft are each assigned a driver wheel which is drivable in a slip free manner by the relevant shaft, wherein the driver wheels have radially running openings which are arranged at an angular distance from one another over the circumference of said driver wheels and in each of which a driver pin which is spring loaded towards the periphery is arranged, said driver pins automatically engaging in a form fitting manner in the relevant reversing station in driver openings arranged on opposite sides on the pallets and also being automatically released again on the opposite strand, wherein, on the loading or unloading side, the one gearwheel is arranged in a freely rotatable manner on the associated shaft via a freewheel, and said shaft is driven by an electric motor which can be switched on and off and is controllable or regulatable in the rotational speed thereof, in such a manner that, on entry into the associated reversing station, the relevant pallet passes a sensor which detects the position of the pallet and transmits a switching pulse, whereupon the electric motor sets the shaft into rotation and, on further rotation, passes a further sensor which then decelerates the rotation speed of the electric motor and, on a further rotational movement which corresponds to the loading or removal station of the pallet, switches off the energy supply to the electric motor and brings the electric motor into a stopping position, whereupon the relevant angular position of the driver wheels of the shaft is mechanically locked and, after the loading or unloading of the relevant pallet and after the mechanical unlocking, the energy supply to the electric motor is switched on again and the shaft is set into rotation and, after reaching the starting position, by the energy supply to the electric motor being switched off, the driver wheels are rotated again into the starting position thereof by stopping of the shaft.

5. Accumulating conveyor according to claim 4, characterized in that the radially arranged openings are arranged at uniform angular distances from one another over the circumference of each driver wheel.

6. Accumulating conveyor according to claim 5, characterized in that the pallets are also automatically coupled in the region of the top strand as far as the horizontal region of the bottom strand to the associated driver wheels by the driver pins.

7. Accumulating conveyor according to claim 4, characterized in that braking devices are arranged in the region of the respective reversing stations on both sides of the accumulating conveyor, said braking devices decelerating the circulating speed of each pallet on entry into the relevant reversing station (creep speed) and optionally braking said pallet to a standstill.

8. Accumulating conveyor according to claim 4, characterized in that the pallets are forcibly guided on both sides by means of pallet wheels in rails.

9. Accumulating conveyor according to claim 4, characterized in that the gearwheels on the respectively associated shafts are arranged in the region of the longitudinal axis of the accumulating conveyor, and in that the underside of each pallet has two spaced apart pallet pinions, to which braking pins are adjustably frictionally connected.

10. Accumulating conveyor according to claim 4, characterized in that the underside of each pallet is provided with a braking roller on both opposite sides, said braking rollers interacting with braking devices arranged on opposite sides in the reversing stations by running onto said braking devices, wherein the relevant braking device has a swingable lever which can be pivoted downwards by the pallet counter to the resetting force of a spring element.

11. Accumulating conveyor according to claim 1, characterized in that braking devices are arranged in the region of the respective reversing stations on both sides of the accumulating conveyor, said braking devices decelerating the circulating speed of each pallet on entry into the relevant reversing station (creep speed) and optionally braking said pallet to a standstill.

12. Accumulating conveyor according to claim 1, characterized in that the pallets are forcibly guided on both sides by means of pallet wheels in rails.

13. Accumulating conveyor according to claim 1, characterized in that the first and second gearwheels on the respectively associated first and second shafts are arranged in the region of the longitudinal axis of the accumulating conveyor, and in that the underside of each pallet has two spaced apart pallet pinions, to which braking pins are adjustably frictionally connected.

14. Accumulating conveyor according to claim 1, characterized in that the underside of each pallet is provided with a braking roller on both opposite sides, said braking rollers interacting with braking devices arranged on opposite sides in the reversing stations by running onto said braking devices, wherein the relevant braking device has a swingable lever which can be pivoted downwards by the pallet counter to the resetting force of a spring element.

15. Accumulating conveyor according to claim 1, characterized in that the flexible tension element is a belt or chain.

16. Accumulating conveyor according to claim 1, characterized in that the first shaft to which the first gearwheel is connected in terms of drive for conjoint rotation is driven continuously by an asynchronous electric motor.

17. Accumulating conveyor according to claim 1, characterized in that the accumulating conveyor is configured for use in the motor vehicle industry for conveying body parts on pallets.

18. Accumulating conveyor according to claim 4, characterized in that the flexible tension element is a belt or a chain.

19. Accumulating conveyor according to claim 4, characterized in that the flexible tension element which is motor-driven is driven continuously.

20. Accumulating conveyor according to claim 4, characterized in that the accumulating conveyor is configured for use in the motor vehicle industry for conveying body parts on pallets.

* * * * *